United States Patent Office 3,391,939
Patented July 9, 1968

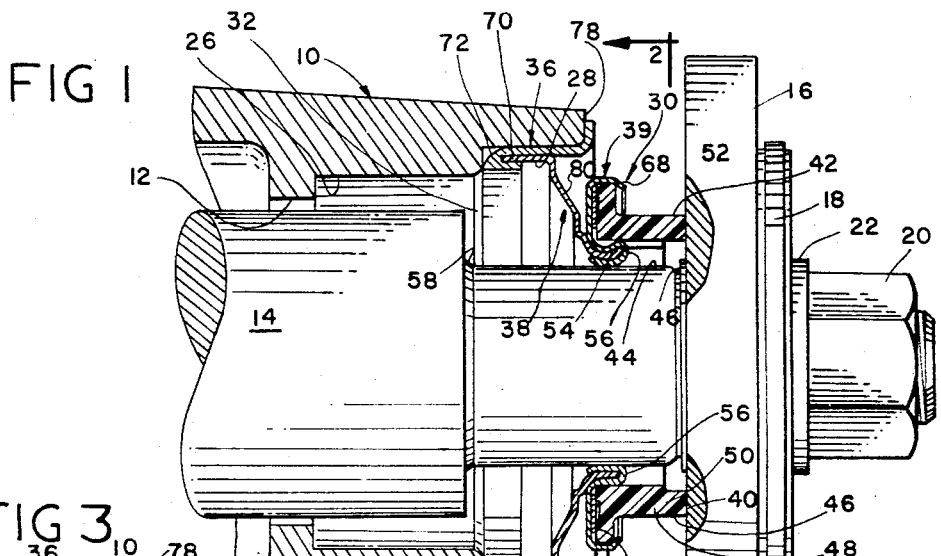
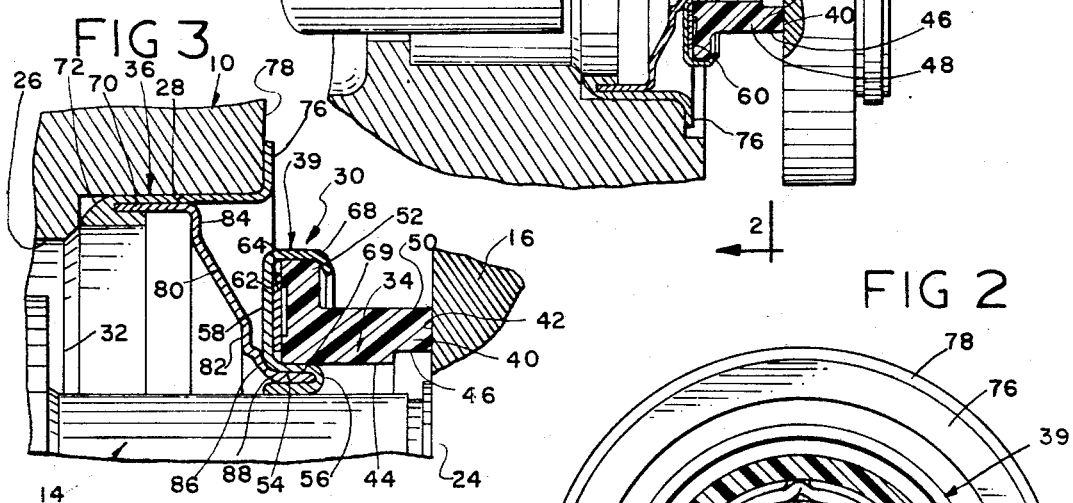
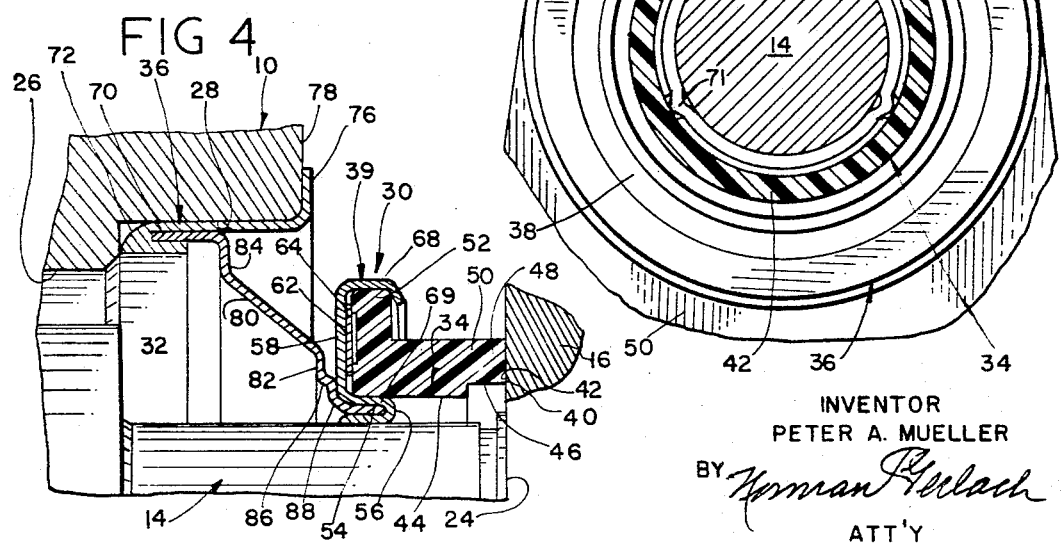

3,391,939
ROTARY MECHANICAL SEAL
Peter A. Mueller, Oak Park, Ill., assignor to Mueller Seal Company, Lyons, Ill., a corporation of Delaware,
Continuation-in-part of application Ser. No. 428,023, Jan. 26, 1965. This application July 28, 1965, Ser. No. 475,347
1 Claim. (Cl. 277—42)

This application is a continuation-in-part of my copending patent application Ser. No. 428,023, filed on Jan. 26, 1965, now Patent No. 3,332,692, and entitled Rotary Mechanical Seal.

The present invention relates generally to mechanical sealing devices and has particular reference to a rotary mechanical seal of the type which effects a seal against the passage of fluid between relatively rotatable machine parts, such, for example, as the rotary shaft of an automotive water pump and the stationary portion of the pump casing through which the shaft extends. The invention is particularly concerned with that type of rotary mechanical seal wherein the sealing effect between the relatively rotatable parts occurs at radially extending surfaces and a so-called running seal is provided between the relatively rotatable parts along an interfacial plane.

The opposed contacting running surfaces of a rotary mechanical seal of the type under consideration are usually provided on a pair of opposed sealing elements, one of which is commonly known as the "seal seat" and the other of which is commonly termed the sealing "washer." In an automotive water pump seal, the washer usually is maintained stationary while the seat rotates in running sealing engagement with the washer. To attain this relationship, the seat is carried on the impeller shaft of the pump and rotates therewith while the washer is sealed to the wall of the pump casing opening through which the impeller shaft extends and is thus maintained stationary except for its ability to shift axially to compensate for combined washer and seat wear. In some installations, however, the seat may be press-fitted within the pump casing opening and the washer is carried by and rotates with the shaft and is spring-pressed toward the seat for the purpose of taking up wear. Whether the washer be maintained stationary while the seat constitutes the rotatable effective sealing element, or whether the reverse be true, it has heretofore been the practice, almost invariably, to employ elastic elements and helicoidal springs to maintain the necessary spring pressure between the parts for effective sealing and for wear take-up purposes. Where an elastic element, commonly termed a "bellows," is employed for sealing the washer to the wall of the pump casing opening, numerous adverse influences arise, both in the manufacture and assembly of the seal and as a result of operating conditions when the seal is put into service. One of these influences is the variable pressure of fluid on the bellows which affects sealing pressure at the interfacial plane between the rotating and stationary sealing elements.

It is an object of the present invention to provide a rotary mechanical seal employing a sealing washer which exerts a specific and predetermined pressure against its seat, this pressure being fairly constant during the life of the seal and independent of variations in fluid pressure, thus insuring satisfactory sealing at both high and low pressure differentials on opposite sides of the seal, as well as being independent of variations in the speed of the rotating element or part. In carrying out this object, the invention contemplates the provision of an all metal seal assembly which is devoid of an elastic element or bellows, as well as of helicoidal compression springs for forcing the washer against its seat.

Still more specifically, the invention eliminates the aforementioned bellows and spring combination and in its stead, there is employed a single metal element in the form of an imperforate metallic backing ring having a frusto-conical section, the ring serving the dual function of yieldingly urging the washer against its cooperating seat, and also of sealing the washer to the surrounding annular retainer which, in turn, is sealed to the wall of the casing through which the rotating shaft extends, the latter sealing means being in the form of a press-fit between the retainer and the wall.

It is a specific object of the invention to provide in a seal of the character briefly outlined above a novel means for effecting a torque-resisting sealed connection between the sealing washer and the small end of the generally frusto-conical sealing ring, as well as to provide a similar torque-resisting sealed connection between the washer and the retainer. In the case of the washer, the torque-resisting connection is made by means of a novel form of assembly ferrule which is crimped to both the washer and the sealing ring. In the case of the annular retainer, the latter is crimped directly to the sealing ring. This results in a four-piece metallic assembly, the parts being held together by a binding action of crimped parts and the assembly constituting a package-type unit which is capable of being installed bodily in an automotive water pump or other device for which the seal is intended or designed.

Whereas in the case of a bellows-type seal, the ability of the elastomeric bellows to elongate will more than compensate for the amount of wear that may take place between the sealing washer and its seat, in the case of a seal which employs a metallic sealing or backing ring, the compressional characteristics of the ring are such that resistance to axial thrust on the washer by the ring is acompanied by only a small displacement of the forward end of the backing ring. According to the present invention, and in order to increase the extent of axial displacement of which the forward end of the backing ring is capable, a special configuration is given to the backing ring whereby flexing thereof to a degree sufficient to accommodate wear between the washer and seat is made possible. Furthermore, such flexing of the backing ring is of a sufficient magnitude that with a freshly installed seal, the washer is not placed under an unduly high degree of compression which, otherwise, might tend to cause the seal to run dry. The provision of a rotary mechanical seal which employs a metallic backing ring having the degree of axial flexibility briefly outlined above and for the purpose stated constitutes one of the principal features of the present invention.

Another object of the invention is to provide a rotary mechanical seal which is an improvement upon and has certain advantages over that which forms the subject matter of my copending United States patent application Ser. No. 428,023, above referred to.

It is a further object of the invention to provide such a package-type seal wherein the various constituent or component parts thereof assume nested positions so that they occupy but little space, particularly axial space, thus rendering the seal as a whole acceptable for use in a relatively short annular space.

It also is an object of the invention to provide a rotary mechanical seal which, because of its small number of parts, may not only be manufactured at a lower cost but also is less likely to get out of order when in service.

Other objects and advantages of the invention, not at this time enumerated, will readily become apparent as the following description ensues.

In the accompanying single sheet of drawings forming a part of this specification, one illustrative embodiment of the invention is shown.

In these drawings:

FIG. 1 is a fragmentary sectional view taken substantially centrally and longitudinally through a rotary mechanical seal constructed according to the present invention, certain parts being shown in elevation and other parts being broken away in order more clearly to reveal the nature of the invention;

FIG. 2 is a transverse sectional view taken substantially along the line 2—2 of FIG. 1;

FIG. 3 is an enlarged radial sectional view taken through a portion of the structure shown in FIG. 1 and showing the backing ring in its compressed position of use but before the washer and seat have been subjected to any appreciable degree of wear; and FIG. 4 is a sectional view similar to FIG. 3 but showing the backing ring after it has been axially extended or expanded as the result of an appreciable degree of washer and seat wear.

Referring now to the drawings in detail, the rotary mechanical seal of the present invention has, purely for exemplary purposes, been illustrated herein as being operatively installed in a recessed opening in an engine block, such opening having one end of a rotary engine shaft projecting axially therethrough. A fragment of the engine block is designated by the reference numeral 10, the opening by the reference numeral 12, and the shaft by the reference numeral 14. The shaft 14 is rotatably mounted in the usual bearings (not shown) and carries at its outer end a flywheel 16 having the usual power take-off belt and pulley arrangement 18. A nut 20 and a washer 22 serve to clamp the flywheel 16 against an annular shoulder 24 on the shaft 14. The opening 12 is recessed by a first counterbore 26 which, in turn, is recessed by a second and larger counterbore 28, the rotary mechanical seal of the present invention being operatively installed in the second counterbore.

The rotary mechanical seal of the present invention is designated in its entirety by the reference numeral 30 and is provided for the purpose of preventing passage of oil or other liquid outwardly along the annular space 32 which exists between the recessed opening 12 and the shaft 14. The seal 30 comprises four principal parts, namely, a sealing washer 34, an annular retainer 36, a backing ring 38, and an assembly ferrule 39. The backing ring 38 is generally of frusto-conical design and has its small end portion fixedly secured to the washer 34 by means of the aforementioned assembly ferrule. The large end portion of the backing ring 38 is secured to the retainer by a crimping operation which is effected on the retainer in a manner that will be described presently. The washer 34 is adapted to make running sealing engagement with the rear or inside face 40 of the flywheel 16, this face being lapped to a flat condition and constituting a seat for the washer.

The washer 34 may be formed of various materials which have been found acceptable for sealing washer construction and among these materials are close-grained cast iron, brass, stainless steel and the like. One material which has been found particularly useful in the manufacture of a rotary mechanical seal for automotive use is a synthetic thermosetting resin containing a powered metal alloy of lead, antimony and tin. Under certain circumstances, especially where caustic liquids are involved, a ceramic material may be employed for the washer 34. The washer 34 is in the form of an annular ring which loosely surrounds the shaft 14 and presents its running annular seal face 42 to the opposed seat-forming seal face 40 on the flywheel 16. The two seal faces are preferably lapped to an extremely high degree of flatness on the order of 0.0007, approximating the wave length of light so that they will exclude the entrance therebetween of liquid except in such minute quantity as to maintain lubrication of these faces for anti-squeal and other purposes. The washer 34 is provided with a central axial opening 44, the forward region of the opening relieved as at 46 to provide a forwardly extending nosepiece 48 on which the previously mentioned seal face 42 is formed. The radial thickness of the seal face 42 is thus somewhat less than the radial thickness of the washer as a whole. The body portion 50 of the washer 34 is cylindrical and of appreciable axial extent. At its rear end, the body portion 50 is provided with an integral outwardly extending continuous annular attachment flange 52 by means of which the washer 34 as a whole may be fixedly attached to the forward rim region 54 of the backing ring 38.

The assembly ferrule 39 is in the form of a ring which may be formed of brass or other suitable metal, and the inner peripheral region of this ferrule is crimped around the forwardly extending rim region 54 of the washer 34 by means of a tightly pressed reentrant bight portion 56. The rear portion or wall 58 of the assembly ferrule 39 extends in a radial plane immediately forwardly of the rear end face 62 of the washer 34 and, preferably, but not necessarily, a thin gasket 64 is interposed between the wall 58 and the rear end face 62. The gasket may be of paper-like fibrous material or it may be of an elastomeric nature. Under certain circumstances, the gasket may be formed of a plastic material such as "Teflon" or synthetic rubber. The outer region of the assembly ferrule 39 is crimped around the outer periphery 66 of the attachment flange 52 by means of a wide but tightly pressed reentrant bight portion 68. After the assembly ferrule has been crimped about both the forwardly extending rim region 54 of the backing ring 38 and about the attachment flange 52, the bight portion 68 opposes one side of the bight portion 56 and, in effect, establishes a third reentrant bight portion which is effective radially against the attachment flange 52 to hold the assembly ferrule securely on the washer. The first reentrant bight portion and the third reentrant bight portion have one leg portion 69 in common.

As best seen in FIG. 2, the three thicknesses of material that are afforded by the forward rim region 54 of the backing ring 38 and the reentrant bight portion 56, are collectively provided with three radially offset crimped regions 71 which insure against any possible circumferential slippage of the washer and its ferrule assembly relative to the backing ring 38. At the rear end of the backing ring 38, the retainer is tightly crimped to the rearwardly extending cylindrical rim region 70 of the former by means of a reentrant bight portion 72. The body portion 74 of the annular retainer 36 is cylindrical and fits tightly within the large counterbore 28 of the engine block 10. A radially extending annular seating flange 76 is formed on the front end of the retainer 36 and bears against the forward face 78 of the engine block 10, thus limiting the extent of reception of the retainer in the counterbore 28.

The backing ring 38, apart from its forwardly extending forward rim region 54 and its rearwardly extending rear rim region 70, is, in the main, of frusto-conical configuration, a medial section 80 thereof being accurately or truly frusto-conical and merging at its small and large bases with respective annular radial sections 82 and 84 (see particularly FIG. 4). The radial section 84 merges directly with the cylindrical rim region 70, while the radial section 82 merges with a short cylindrical section 86 which projects forwardly therefrom and joins the forward rim region 54 on a curved bias as indicated at 88. The radial sections 82 and 84 are flat. They are arranged in parallel relation and extend at right angles to the axis of the seal.

The backing ring 38 is formed of stainless spring steel and possesses an appreciable degree of resistance to axial end thrust. In the absence of the two radial sections 82 and 84 at the opposite ends of the frusto-conical section 80, the ability of the backing ring to flex under the influence of axial thrust would be insufficient to accommodate normal wear of the forwardly extending nosepiece 48 of the sealing washer 34. Thus, after initial installation of the seal and a period of service (amounting to only a few months in the case of an automotive water pump installation), a rapid decline in the working pressure at the two running seal faces 40 and 42 would render the seal inoperative to perform its intended sealing function. According to the present invention, the provision of the two radial sections 82 and 84 greatly increases the extent to which the backing ring 38 as a whole may flex. The extent to which the backing ring 38 may flex is apparent from a comparison of FIGS. 3 and 4, the former view representing the condition of the seal at the time of installation, and the latter view representing the condition of the seal after a prolonged period of use and consequent wear of the nosepiece 48.

In the operation of the seal, after the retainer 38 has been pressed into the counterbore 28 and the flywheel 16 has been installed upon the shaft 14, the washer 34 will be yieldingly urged forwardly against the annular seat face 40 existing on the rear surface of the flywheel. With a newly installed seal, the backing ring 38 will be flexed to the degree indicated in FIG. 3 wherein the slant angle of the frusto-conical section 80 is comparatively gradual and working pressure will be established between the two running seal faces 40 and 42. The tightness of the two crimped regions established by the bight portions 56 and 68 against the washer 34, coupled with the pressure that is exerted by these bight portions against the radial attachment flange 52 in a radial direction will prevent relative turning movement between the washer 34 and the backing ring 38. Stated otherwise, the assembly ferrule 39 will establish an effective "drive" between the washer 34 and the backing ring, albeit, the washer in the illustrated environment for the seal is non-rotatable. A similar "drive" is established between the retainer 34 and the backing ring 38 by reason of the crimping of the retainer around the rear rim region of the backing ring.

During continued and prolonged operation of the seal, and as the nosepiece 48 consequently becomes worn, as shown in FIG. 4, the backing ring 38 will continue to urge the washer 34 forwardly against the seat and thus take up wear. It will be noted that in the fully compressed state of the backing ring 38 as represented by the installation of a new and unworn seal in FIGS. 1 and 3, the rear end of the washer and ferrule assembly enters the generally cylindrical confines of the retainer 36. As wear on the nosepiece 48 takes place, this washer and ferrule assembly moves bodily forwardly so that near the end of the useful life of the seal, the assembly lies well forwardly of the open front rim of the retainer 36 as shown in FIG. 4.

It is also to be noted that such flexing of the backing ring 38 is accompanied by a change in the radial position of the reentrant bight portion 56 of the assembly ferrule 39. This reentrant bight portion remains unconfined and within the annulus which exists between the shaft 14 and the inner cylindrical surface of the sealing washer 34 so that it is free to flex bodily between the position of FIG. 3 wherein it is in close proximity to the shaft 14 and the position of FIG. 4 wherein it is in close proximity to the body of the washer 34. The angular position of the reentrant bight portion 56 will change as the slant angularity of the frusto-conical section 80 of the backing ring changes.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In a rotary mechanical seal for sealing an opening in a housing wall and through which opening a rotatable shaft extends forwardly, an anti-friction washer having a cylindrical bore extending therethrough and adapted loosely to surround the shaft, said washer having an annular forward end face designed for running engagement with a cooperating annular radial surface normal to and turning with the shaft, a one-piece thin flexible backing ring formed of spring material and comprising a forwardly extending cylindrical front rim region, a rearwardly extending cylindrical rear rim region, a straight-sided, forwardly tapered, frusto-conical intermediate section provided with a small front circular base and a large rear circular base, a flat forward annular radial section connecting the small front circular base of the frusto-conical intermediate section to the rear end of the front rim region, and a flat rear annular radial section connecting the large rear circular base of said frusto-conical intermediate section to the front end of the rear rim region, said frusto-conical section and said radial sections possessing high resistance to compression and having a long expansion factor to accommodate wear of said anti-friction washer, and an assembly ferrule operatively connecting the forwardly extending cylindrical front rim region of the backing ring to the washer, the rear rim region of said backing ring being designed for effective sealing engagement with the housing wall.

References Cited

UNITED STATES PATENTS

| | | | |
|---|---|---|---|
| 1,972,565 | 9/1934 | Kempton | 277—90 X |
| 2,189,197 | 2/1940 | Cerny | 277—42 |
| 2,249,930 | 7/1941 | Bailey et al. | 277—42 |
| 2,299,590 | 10/1942 | Reynolds | 277—90 |
| 2,382,960 | 8/1945 | Compton et al. | 277—42 |
| 2,392,998 | 1/1946 | Pross | 277—231 |
| 3,203,704 | 8/1965 | Mueller | 277—42 |

SAMUEL ROTHBERG, *Primary Examiner.*